R. H. St. JOHN.
SEWING-MACHINE DRIVING-MECHANISM.

No. 171,445. Patented Dec. 21, 1875.

WITNESSES
Chas. Gooch
Alex H. Galt

INVENTOR
Roswell H. St. John
By Knight Bros. Attorneys

UNITED STATES PATENT OFFICE.

ROSWELL H. ST. JOHN, OF SPRINGFIELD, OHIO.

IMPROVEMENT IN SEWING-MACHINE DRIVING MECHANISM.

Specification forming part of Letters Patent No. 171,445, dated December 21, 1875; application filed November 27, 1875.

*To all whom it may concern:*

Be it known that I, ROSWELL H. ST. JOHN, of Springfield, in the county of Clarke and State of Ohio, have invented a new and useful Improvement in Sewing-Machine Driving Mechanism, of which the following is a specification:

My invention consists, first, in mounting the driving or band wheel of a sewing-machine in a movable bearing frame or lever, so that the depression of the said wheel or the gravity of the parts may be made to tighten the band, as required. My invention consists, secondly, in so combining a band-wheel running in movable bearings and a friction-pinion that the bearings of the band-wheel may be moved in one direction to cause the wheel to tighten and drive the band, or in another direction to cause it to release the band, and to bear against and drive the friction-pinion to run a bobbin-winder, needle-sharpener, or other device.

Figure 1:
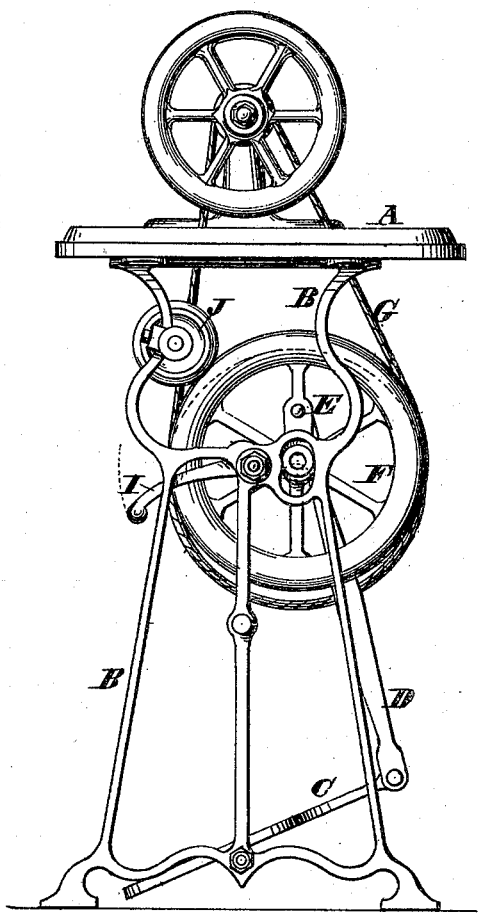
Figure 2:
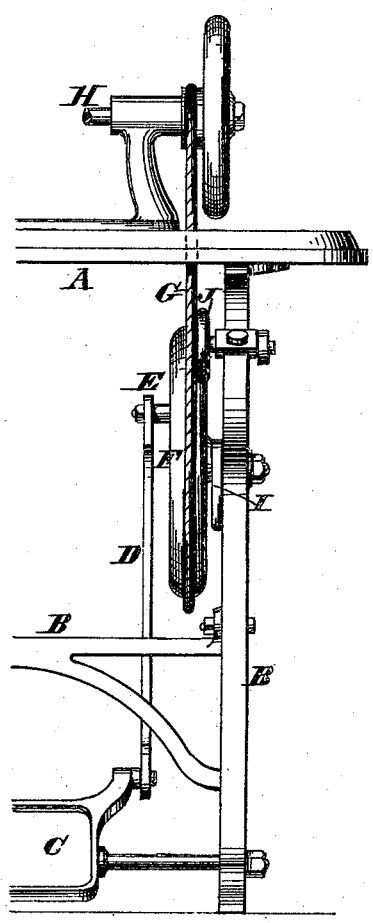

In the accompanying drawings, Figure 1 is an end view of a sewing-machine table and driving mechanism illustrating the invention. Fig. 2 is a front elevation of one end of said table and the driving mechanism.

A represents a portion of a sewing-machine table, and B B portions of the supporting-frame thereof. C is the treadle. D is the pitman, connected to a wrist, E, on the driving-wheel F, to rotate the said wheel. G is the band, which transmits rotary motion from the wheel F to the driving-shaft H. The band-wheel F, instead of running in stationary bearings, as is usual, has its bearings in a vertically-movable frame or lever, I, by which the said wheel may be thrown up to cause it to bear against and drive a friction-pulley, J, when required, and in so doing to release the band G, so that the sewing mechanism, which is connected to the driving-shaft H in any usual or suitable manner, will be left at rest. The friction-pulley J is connected with a bobbin-winder, or may be employed to run a needle-sharpener, or any other appendage of a sewing-machine which it may be desirable to operate while the sewing mechanism remains at rest.

The drawings show the band-wheel F elevated, so as not to drive the band G, but to drive the friction-pulley J of the bobbin-winder or other device. By elevating the free end of the lever I, as indicated by the curved dotted line in Fig. 1, the wheel F will be lowered out of contact with the pulley J, and so as to tighten and drive the band G.

The invention avoids the necessity of unbanding the machine, in order to avoid driving the sewing mechanism while operating the bobbin-winder.

Having thus described my invention, the following is what I claim as new therein, and desire to secure by Letters Patent:

1. A sewing-machine driving-wheel, F, mounted in bearings on a vertically-movable frame or lever, I, for the purpose of tightening the band by the descent and gravity of the wheel, substantially as set forth.

2. The combination of the vertically-adjustable driving-wheel F, the friction-pulley J, and the band G, substantially as herein set forth, to admit of placing the said wheel in operative connection with either the friction-pulley or the band at will, and out of such connection with the other.

ROSWELL H. ST. JOHN.

Witnesses:
H. S. BRADLY, Jr.,
GEO. E. CLARK.